No. 868,049. PATENTED OCT. 15, 1907.
F. M. WIDERMAN.
CORN HARVESTER AND SHOCKER.
APPLICATION FILED AUG. 19, 1904.
8 SHEETS—SHEET 1.
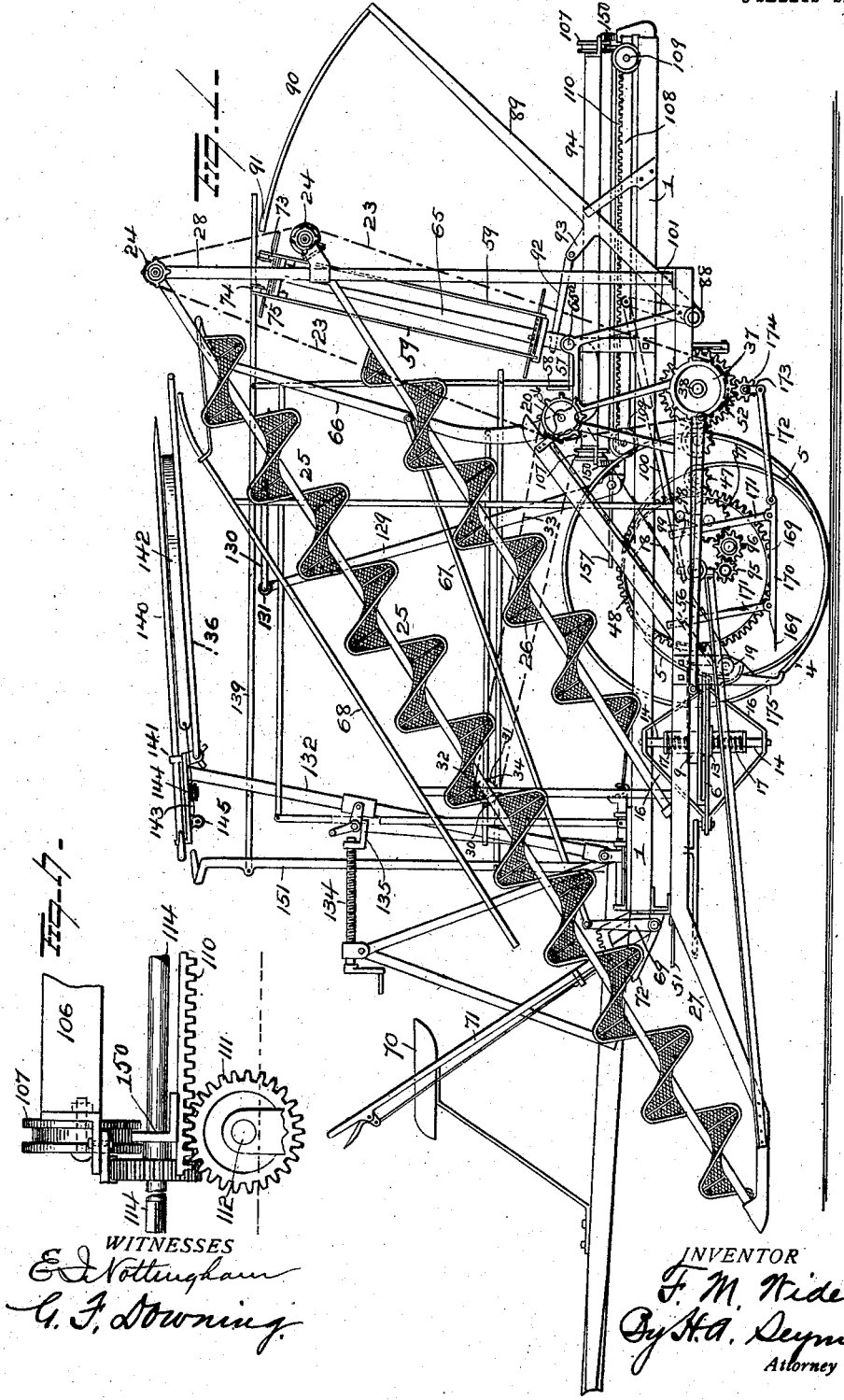
WITNESSES
INVENTOR
F. M. Widerman
By H. A. Seymour
Attorney No. 868,049.
PATENTED OCT. 15, 1907.
F. M. WIDERMAN.
CORN HARVESTER AND SHOCKER.
APPLICATION FILED AUG. 19, 1904.
8 SHEETS—SHEET 2.
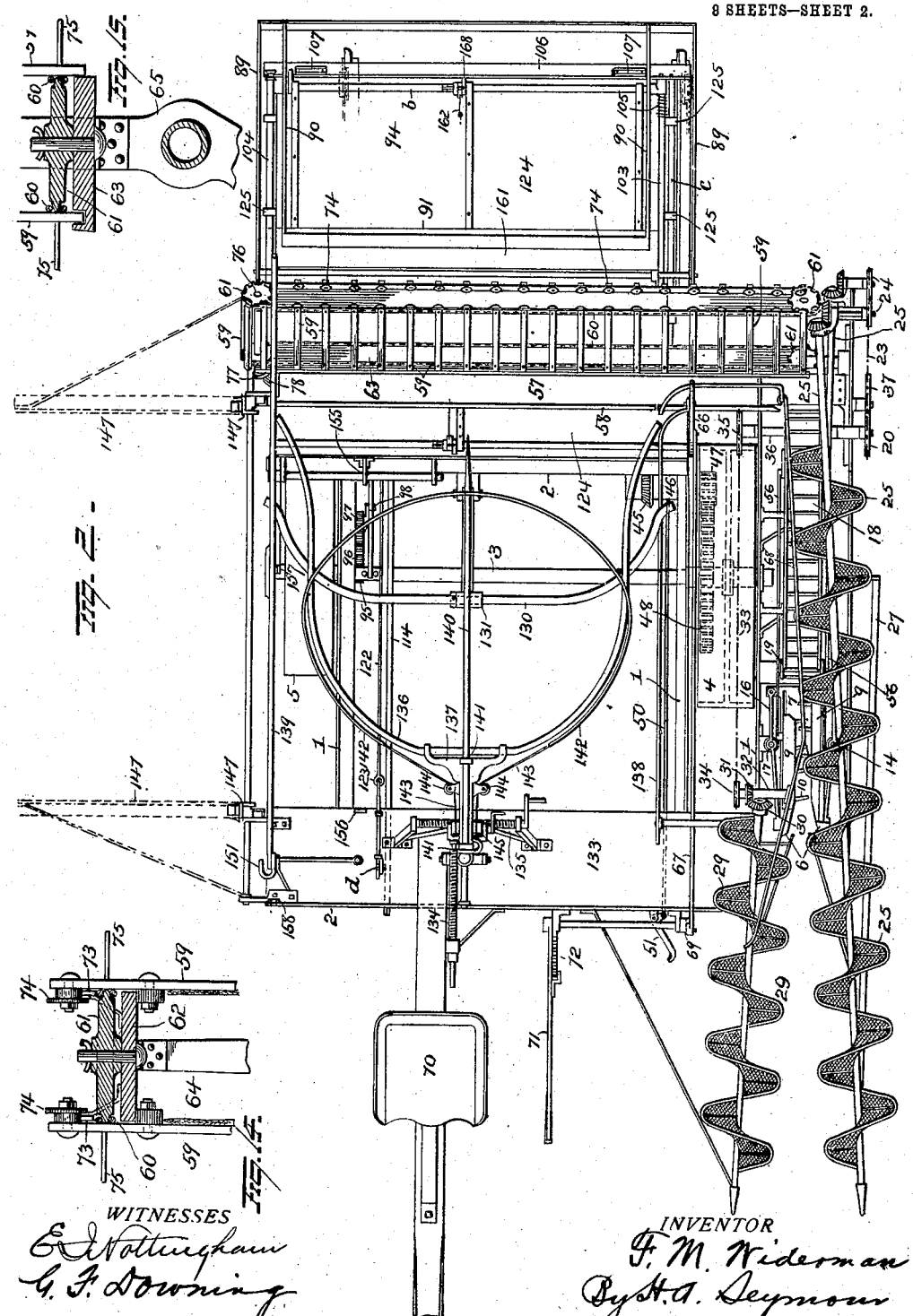
WITNESSES
INVENTOR
F. M. Widerman
By H. A. Seymour
Attorney

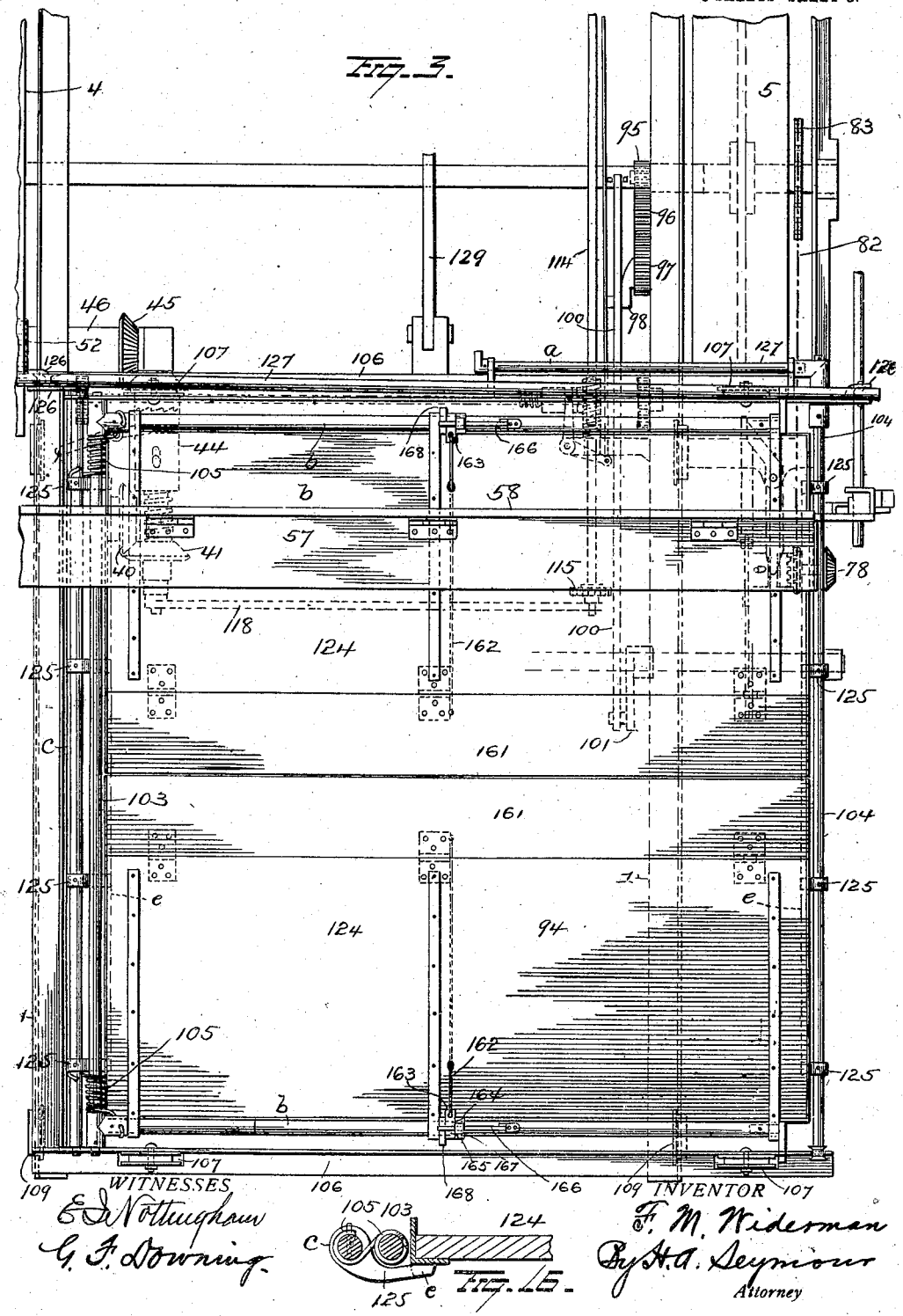

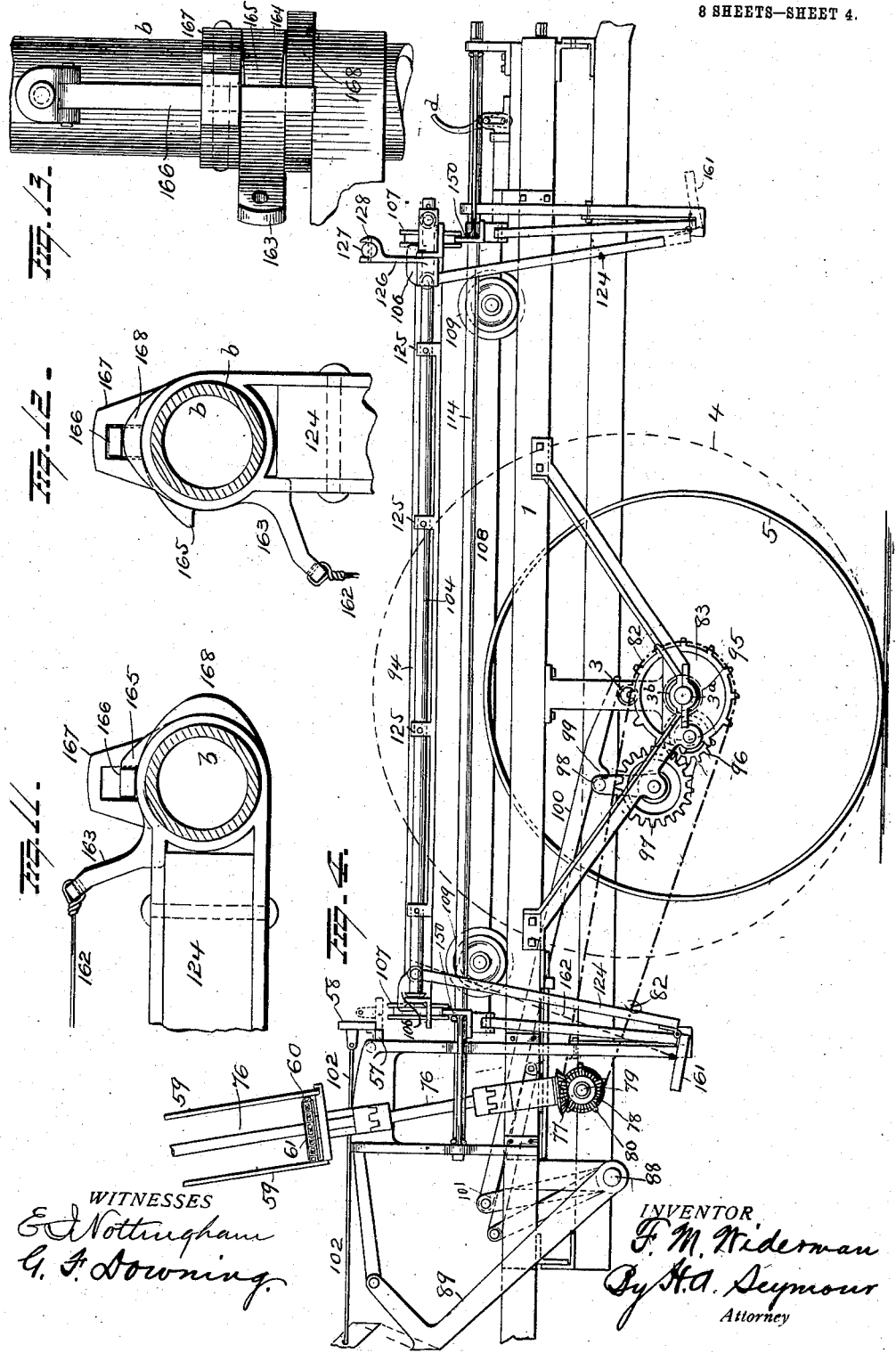

No. 868,049.
PATENTED OCT. 15, 1907.
F. M. WIDERMAN.
CORN HARVESTER AND SHOCKER.
APPLICATION FILED AUG. 19, 1904.
8 SHEETS—SHEET 5.
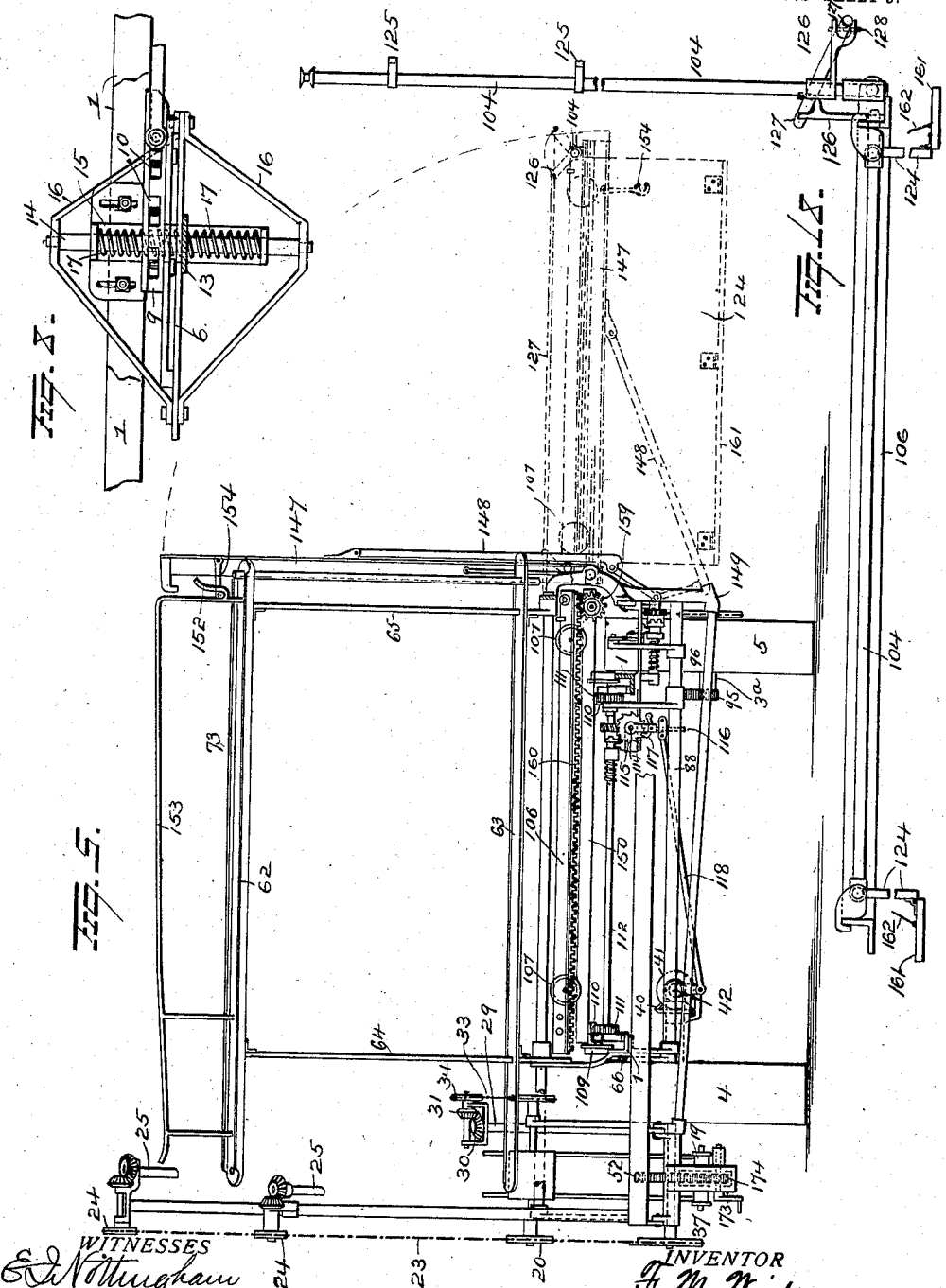

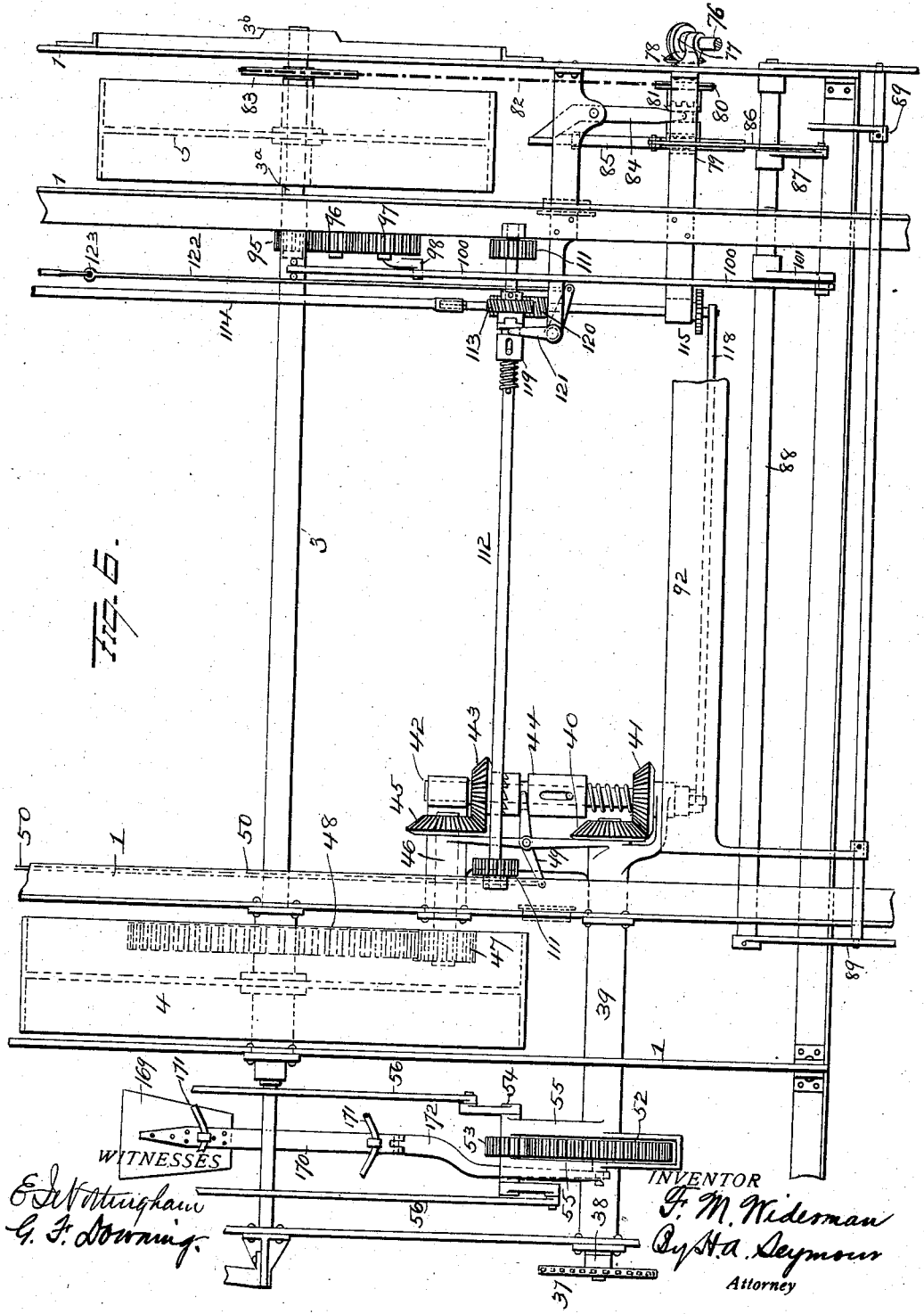

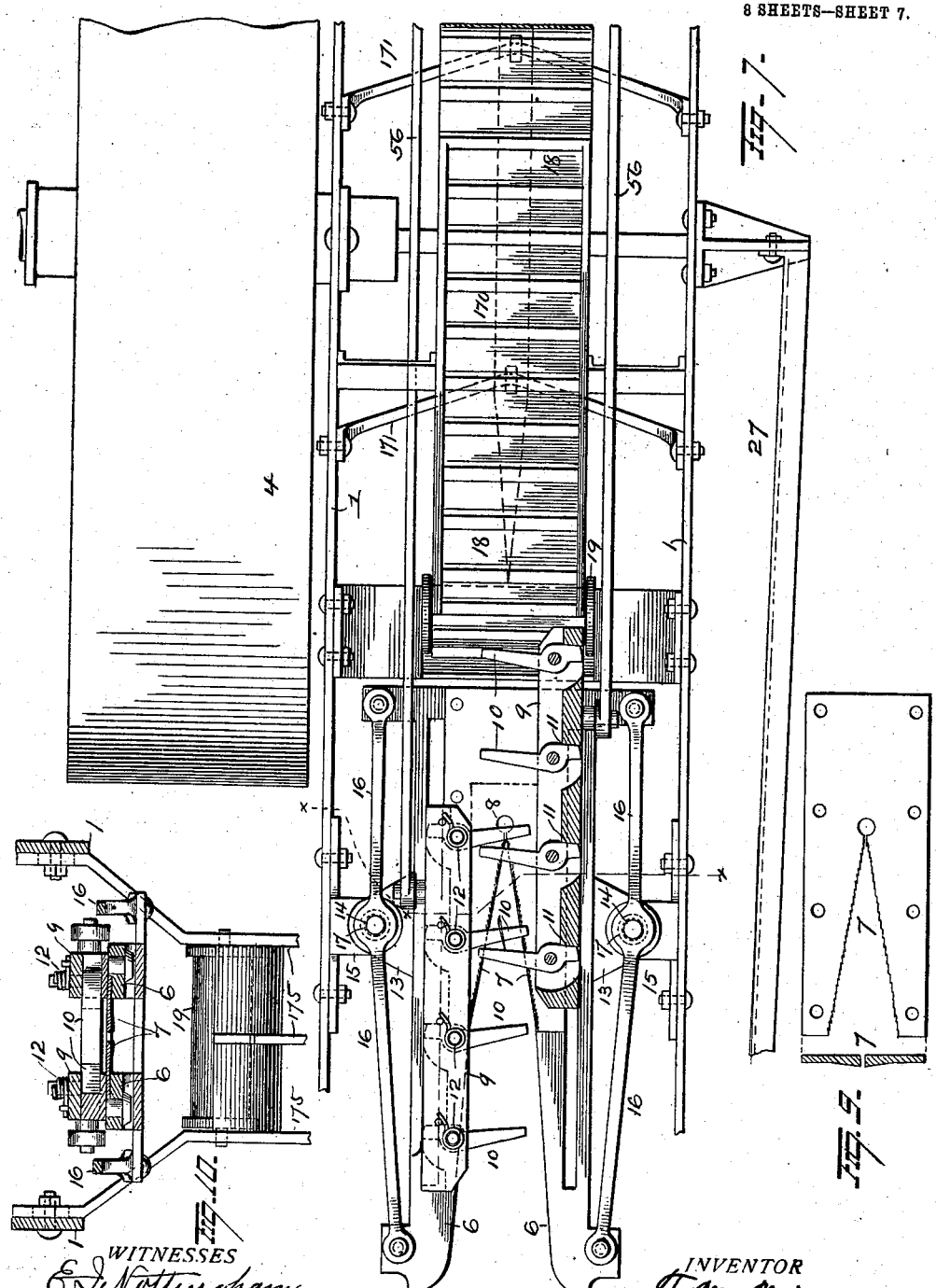

No. 868,049.
PATENTED OCT. 15, 1907.
F. M. WIDERMAN.
CORN HARVESTER AND SHOCKER.
APPLICATION FILED AUG. 19, 1904.
8 SHEETS—SHEET 8.
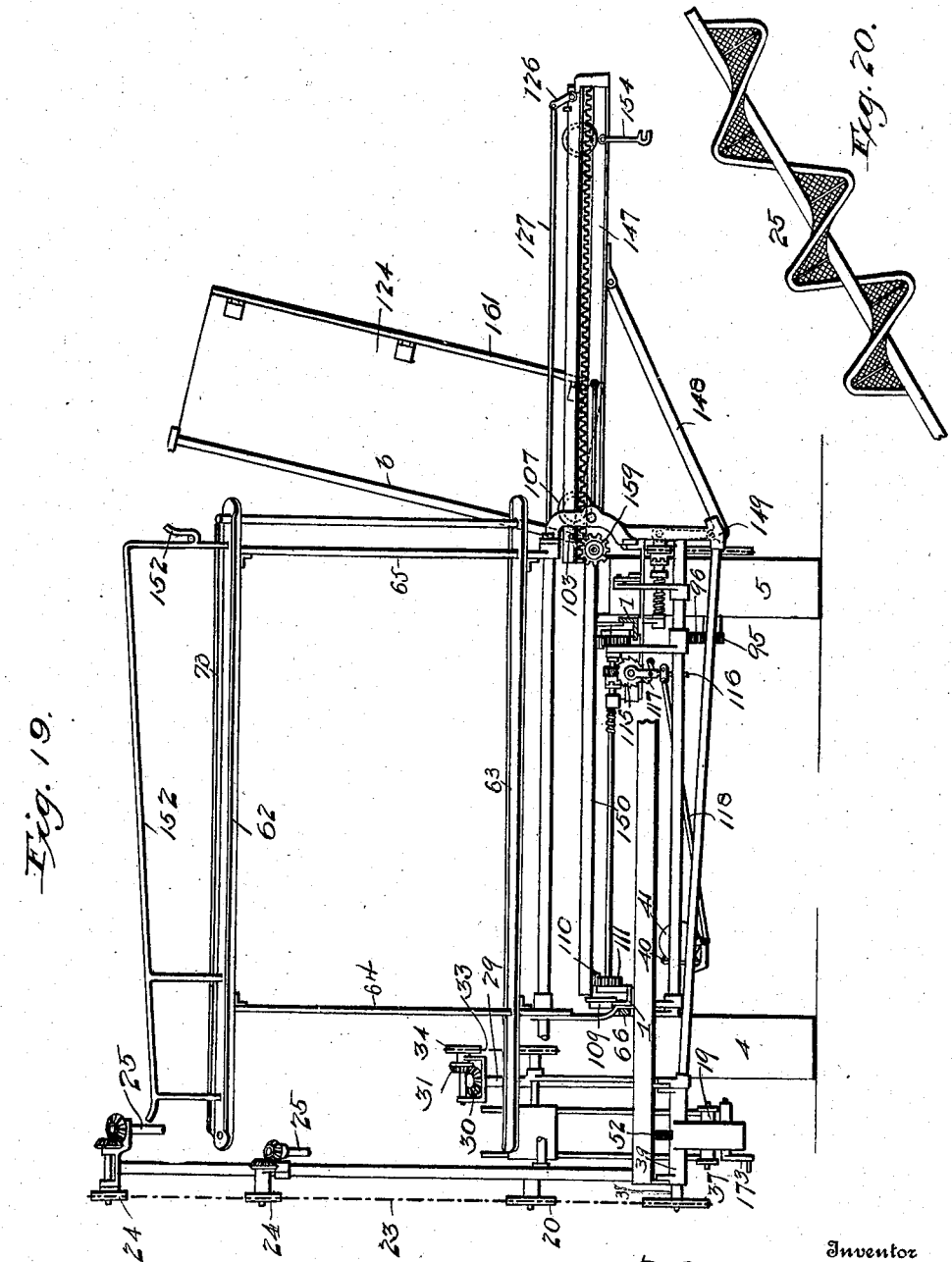

UNITED STATES PATENT OFFICE.

FRANCIS M. WIDERMAN, OF ELLICOTT CITY, MARYLAND.

CORN HARVESTER AND SHOCKER.

No. 868,049.　　　　　　　Specification of Letters Patent.　　　　　Patented Oct. 15, 1907.

Application filed August 19, 1904. Serial No. 221,393.

*To all whom it may concern:*

Be it known that I, FRANCIS M. WIDERMAN, a resident of Ellicott City, in the county of Howard and State of Maryland, have invented certain new and useful Improvements in Corn Harvesters and Shockers; and I do hereby declare the following to be a full, clear, and exact description of the invention, such as will enable others skilled in the art to which it appertains to make and use the same.

My invention relates to an improved corn harvester and shocker, an object of the invention being to provide improved means for cutting the stalks, packing them into shock formation and dropping the shock.

A further object is to provide an improved platform upon which the shock is formed and improved mounting for said platform permitting it to be moved to one side and the shock dropped.

A further object is to provide improved automatic mechanism for packing the stalks into shock formation.

A further object is to provide improved conveyer mechanism for moving the stalks in an upright position to the shock former.

With these and other objects in view, the invention consists in certain novel features of construction and combinations and arrangements of parts as will be more fully hereinafter described and pointed out in the claims.

In the accompanying drawings, Figure 1 is a view in side elevation illustrating my improvements. Fig. 2 is a top plan view. Fig. 3 is an enlarged top plan view of the shock receiving platform; Fig. 4 is an enlarged broken view of the side opposite to Fig. 1. Fig. 5 is a rear end view. Fig. 6 is an enlarged plan view showing the gearing; Fig. 7 is an enlarged plan view of the stalk cutting mechanism; Fig. 8 is a side view thereof; Fig. 9 is a view of the cutter. Fig. 10 is a view in section on the line $x$—$x$ of Fig. 7 and Figs. 11, 12, 13, 14, 15, 16, 17, 18, 19 and 20 are enlarged views illustrating various details of construction. Fig. 19 is a view similar to Fig. 5 showing the platform 94 and its frame elevated; Fig. 20 is a detail view showing the increasing pitch of the upper portion of conveyer 25.

The frame of my improved apparatus comprises parallel longitudinal bars 1 at each side, connected by cross bars 2 and supported on a fixed axle 3, on one end of which a traction wheel 4 is mounted to turn between the side bars 1, and a traction wheel 5 is secured to a stub shaft $3^a$ mounted in bearings $3^b$ secured to frame 1 and said wheel 5 is made of smaller diameter than wheel 4 to permit the shock to be carried to one side over the same, as will more fully hereinafter appear.

To the forward ends of bars 1 at one side of the frame my improved cutter frame 6 is secured and has secured thereon a cutter plate 7 having V-shaped recess therein with notched edges to receive and cut the stalks as the machine moves over the ground and this cutter is made thickest at its center and tapers to its edges and has an opening 8 at the point of the V-shaped recess to prevent the accumulation of material at this point and the clogging of the cutter.

Mounted to reciprocate longitudinally on the cutter frame 6, are slide bars 9 carrying fingers 10 normally held at right angles to the bars and projecting toward each other and are held against stops or shoulders 11 on the bars 9, by coiled springs 12 located on the pivot pins of said fingers. The fingers 10 move back and forth over the V-shaped cutting recess of plate 7 and serve to hold the stalks upright in position to be cut and not knocked over by the advancing cutter and owing to the pivoting of the fingers they are free to swing during their outward movement to pass the rearwardly moving fingers on the opposite side, and the stalks held thereby.

To permit elastic up and down movement of the cutter plate, and prevent breaking of the plate or injury to the machine, should the traction wheels fall into a depression or ride over a hill while the cutter is partially through a stalk, the cutter frame 6 is provided at opposite sides with perforated lugs 13 to receive bolts or rods 14, which also pass through brackets 15 having slot and bolt connection with bars 1 to permit adjustment of the cutter up and down. Braces 16 connect the ends of the rods 14 with cutter frame 6 and coiled springs 17 are located on said rods 14 and bear at their respective ends against the brackets 15 and lugs 13 to normally hold the cutter frame and cutter stationary, yet permit of up and down movement thereof to insure a thorough cut of the cutter after once entering a stalk, regardless of the uneven condition of the ground over which the machine is passing.

The cut stalks move rearward to an inclined endless apron 18 mounted on spools or drums 19 the upper or rear spool secured on a shaft having a sprocket wheel 20 at its end. Motion is transmitted to the sprocket wheel 20 by a chain 23 which also turns a series of sprocket wheels 24 and worm or screw conveyers 25 and 26 having gearing connected with said sprocket wheels 24.

The upper and longer conveyer 25 is supported at its forward end by an extension bar 27 secured to a bar 1, and at its rear end by an upright 28, the lower and shorter conveyer 26 is similarly supported. Both conveyers 25 and 26 are disposed at an incline and coöperate with a similar conveyer 29 at the other side of the cutter 7 and apron 18, to direct the stalks rearward and maintain them in an upright position. The conveyer 29 has a beveled gear 30 on its rear end, driven by a beveled gear 31 on a short shaft 32 also carrying a sprocket wheel 34 to which motion is transmitted by a chain 33 driven by a sprocket wheel 35 on a shaft 36 which carries the rear drum of apron 18 and motion is received through the same.

Chain 23 is driven by a sprocket wheel 37 on a shaft 38 supported on a casting 39 on frame 1 and carrying a beveled gear 40 at its inner end, meshing with a similar gear 41 on a short shaft 42 at right angles to shaft 38. This shaft 42 also carries a beveled gear 43 connected by a spring pressed clutch 44 with the shaft, and receiving motion from a beveled gear 45 on a short shaft 46 having a pinion 47 thereon meshing with a drive gear 48 on the hub of traction wheel 4. The clutch 44 has an annular groove to receive one end of a lever 49 pivoted between its ends and connected at its other end by a rod 50 with a hand lever 51 at the forward end of the machine frame, permitting the operator to throw the clutch 44 and prevent transmission of power to the mechanisms operated by traction wheel 4.

A gear 52 is fixed on shaft 38 and drives a smaller gear 53 on a crank shaft 54 supported in parallel arms 55 on casting 39 and the crank arms of said shaft 54 are connected by pitmen 56 with slide bars 9 to reciprocate the latter for the purpose above explained.

The stalks carried up by apron 18 are deposited on a track 57 extending practically across the machine and having a hinged gate 58 at its forward edge to hold the stalks on the track until they are pushed off as will hereinafter appear. The stalks are conducted along track 57 by an apron conveyer 59 having sprocket chains 60 thereon to be driven by sprocket wheels 61 carried by upper and lower cross bars 62 and 63 said bars being supported near their ends by levers 64 and 65 respectively pivoted at 65ᵃ to the frame, the lever 65 having a long arm 66 bent at its end into an eye movable on a stalk guide bar 68, and said arm is connected by a rod 67 with a crank shaft 69 at the forward end of the frame 1, and on which, near the operator's seat 70 a lever 71 is secured and has spring detent to engage a toothed segment 72 and lock the lever at any position. By means of this lever the apron 59 can be tilted to any incline desired to accommodate itself to the incline of the ground over which the machine is passing.

To prevent displacement of the apron conveyer 59 due to its weight, upper bar 62 is made with a track 73 on which wheels 74 on the inner face of the conveyer run and the lower bar 63 is grooved at its forward edge to serve as a guide for the apron, which latter is provided with a series of outwardly projecting fingers 75 to insure the lateral feed of the stalks on track 57.

The sprocket wheels 61 at one end of the conveyer 59 are secured upon a flexible shaft 76, having a beveled gear 77 thereon meshing with a similar gear 78 on a short shaft 79. A sprocket wheel 80 is located on shaft 79 and locked thereto by a spring pressed clutch 81 and a sprocket chain 82 connects sprocket wheel 80 with a drive sprocket wheel 83 on the outer end of the hub of wheel 5. The clutch 81 is annularly grooved to receive one end of a cam lever 84, pivoted between its ends, and operated by a sliding bar 85 connected by a link 86 with a crank arm 87 on a pivot or hinge rod 88 of my improved pusher frame which will now be described.

The rod 88 has secured thereto normally inclined arms 89 having forwardly projecting curved bars 90 at their upper ends, connected by a cross bar 91 constituting the upper pusher, and a lower pusher 92 of similar construction is connected to lugs 93 on arms 89. The upper pusher 91 is adapted to move over conveyer 59 and the lower pusher 92 moves below the same, to force the stalks from track 57 onto a platform 94 below the same and the pusher frame is operated as follows: A pinion 95 secured to the inner end of the stub shaft 3ᵃ of wheel 5 transmits motion to a gear 96 and the latter to a gear 97, having a crank pin 98 thereon to engage a depending shoulder or lug 99 on a rod 100, connected with a crank arm 101 on the pivot rod 88, and as said gear 97 revolves the pin 98 engages the shoulder or lug 99 and pulls the rod 100 and pusher forward to push the stalks from track 57 onto platform 94 and also moves slide bar 85 to operate cam lever 84 and move clutch 81 to stop the apron 59 while the stalks are being pushed off the track. The pusher falls back to its former inoperative position and clutch 81 is permitted to spring into position to lock the sprocket wheel 80 to its shaft and have the conveyer 59 resume operation.

The hinged gate 58 at the forward edge of track 57 is connected by a cord 102 with one of the arms 89, so that when the latter moves rearward the hinged gate 58 will be drawn up to vertical position, and when the pusher moves forward the gate will be permitted to fall and allow the stalks to be forced off the track 57 onto platform 94.

The platform 94 is surrounded by a frame comprising bars b, b, 103 and 104, the members of the platform being hinged to the bars b, b, and the latter being rigidly secured to the bar 103. The bar 103 of the platform frame is provided at its ends with journals mounted in the parallel bars of a frame 106, so that the platform can be turned up to a vertical position, on said journals as a fulcrum, this movement of the platform being assisted by springs 105 coiled on the bar 103 and secured at one end to a bar c mounted in the frame 106. The bar 104 at one side of the platform is supported at one end upon the outer bar of frame 106 and at its other end by a crank shaft a, the said bar 104 being thus permitted to be turned up to a vertical position, the crank on the shaft a acting as a stop.

The hinged members of the platform are supported and operated as hereinafter described. The frame 106, on its cross bars, is provided with grooved rollers 107 to run on tracks 150 on a carrier 108, the latter being provided with wheels 109 on its longitudinal bars, mounted to run on side bars 1 and longitudinal racks 110 are provided on the bottom of the carrier and propelled by pinions 111, secured on a shaft 112. On this shaft 112 is a worm wheel 113 connected by a spring pressed clutch 119 with said shaft 112, and said worm wheel is operated by a worm 120 and a shaft 114 supported in suitable bearings, extends to the forward end of the machine frame and is made angular at its forward end to receive a crank or wrench and move by hand the platform and carrier to its rear position after the shock is dropped.

To propel the carrier and platform forward as the shock is formed, a ratchet wheel 115 is secured on the rear end of shaft 114 and a swinging lever 116 is fulcrumed on shaft 114, and carries a dog 117 to engage wheel 115 and intermittently turn shaft 114 as the lever 116 is swung. The arm is swung by a pitman 118 connected at one end to a crank arm on the end of shaft 42 and having adjustable connection at its other end with lever 116 to permit the connection to be adjusted up and down on the lever and regulate the stroke thereof and the rapidity of feed of the platform.

The clutch 119 above referred to, is made with an annular groove to receive one end of a bell-crank-lever 121 the other end of said lever being secured to a rod 122 extending longitudinally of the frame and having an enlargement 123 thereon, to be struck by the platform when the latter moves to its extreme forward position, to throw the clutch 119 and stop the forward feed of the platform, and a hand lever d is provided to throw this clutch mechanism whenever desired.

The shock securing base of platform 94, consists of two doors 124 hinged to the front and rear tubes b of the frame and the side tube c and tube 104 have fingers 125 projecting beneath the ends of the doors. The fingers 125 carry bars or strips e disposed under the doors to hold them in a horizontal position. To prevent turning of these tubes c and 104 and consequent opening of the doors, said tubes are made with upwardly projecting crank arms 126 at one end to one of which a rod 127 is pivotally secured and rests in the bifurcated end of the other and has a cross pin 128 to prevent longitudinal movement of the rod through the bifurcated arm and prevent turning movement of both rods c and 104.

At the forward end of carrier 108, a standard 129 is secured and provided at its upper end with a bracket 131, in which a stalk supporting frame 130 is mounted to turn, and while said frame 130 is normally in position to receive and support the stalks from track 57 it can be swung back out of the way by simply giving the same a partial turn in bracket 131.
A standard 132 is connected at the center of a cross timber 133 at the forward end of the machine frame and is pivotally mounted to move both longitudinally and laterally of the frame, and adjusting screws 134 and 135 are connected with the standard 132 to adjust the same laterally and longitudinally of the frame to exactly position the stalk receiving frame 136 at the upper end thereof. This frame 136 also has rotary bearing in a bracket 137 to permit it to be swung back and free the shock.
As the stalks are pushed from track 57 onto platform 94 they rest in an inclined position against frame 130, and as the stalks collect, platform 94 moves forward, the stalks being prevented from falling to the sides of the machine by guide rods 138 and 139. When frame 130 moves far enough forward the upper ends of the stalks will rest against frame 136 and the continued forward movement of the platform 94 will compel the stalks to form a perfect shock with the lower end flared outward all around. A pointed horizontal rod 140 is mounted to slide in suitable bearings 141 at the top of bracket 137 and extend longitudinally of the machine frame and centrally of the stalk receiving frame 136. This rod 140 serves to prevent the stalks from falling to one side of frame 136, especially where the machine is at side hill work, and insures an equal distribution of the stalks and the perfect formation of the shock.

After a sufficient number of stalks have been collected on platform 94 and the latter has moved to its forward position a hook 155 on platform 94 engages and locks with a lug 156 on cross timber 133 and the machine is stopped. A shock tightener or compressor 142 is then employed. This compressor 142 comprises a steel band adapted to be dropped over the shock and is connected at its free ends, by ropes 143, passed around pulleys 144 and secured to a spool or drum 145 having a crank thereon to turn the same, wind the ropes 143 thereon and tightly compress the shock in band 142, and while so compressed the shock is tied, and the rod 140 slid back out of the shock, and frames 130 and 136 swung back out of contact with the shock permitting it free passage to the side of the machine to drop the same as will now be explained.

To one side bar of the machine frame are hinged bars or tracks 147 having elbow braces 148 connected therewith and adapted to strike strongly braced brackets 149 when the bars or tracks 147 are dropped down to horizontal position and support the weight of the platform and shock. These tracks 147 are in position to form continuations or lateral extensions of tracks 150 on the carrier 108 when the latter is moved to its extreme forward position and permit the platform to be run off the tracks 150 of the carrier onto tracks 157 and off to one side of the machine.

To permit the shock to move to the side, the guide rod 139 at one side of the machine is hinged to an upright 151 on cross timber 133 permitting it to be swung upward out of the way and supported when in horizontal position by a hook 152 at the side of an open frame work 153 on top of the frame for conveyer 59, said frame 153 preventing long stalks falling backward over the conveyer 59. The tracks 147 have hooks 154 at their free ends to engage over rod 139 and hold the tracks in a vertical position.

To move the platform to one side out onto tracks 147, a shaft 157 is mounted in suitable bearings in carrier 108 and is adapted when the platform is in its forward position, to project through a bearing 158 on cross timber 133 and is made angular at its end to receive a crank or wrench to turn the same. This shaft 157 has pinions 159 secured thereon and in mesh with racks 160 on platform 94 so that when said pinions 159 are turned the platform rollers 107 are driven out on tracks 147 and carry the platform to one side of the machine to drop the shock. The operator then raises one end of rod 127 to free the pin 128 from bifurcated arm 126 and permit tubes c and 104 to turn and release the doors 124 permit them to fall and drop the shock onto the ground. These doors 124 have hinged sections 161 at their edges and cords 162 are secured at one end to the underside of the sections 161, extend through openings in the doors and are secured at their other ends to fingers 163 secured to or integral with collars 164 mounted to turn on rods b and said collars 164 each are made with a tooth or shoulder 165 normally located against the side of a trip 166 pivoted to rods b and projecting through a guide recess in a collar 167 secured on the rod. The hinges of the door are made with cam enlargements 168 adapted when the doors reach their complete open position to ride under the ends of trips 166 and release the collars 164 and permit the fingers 163 to fall and allow the hinged sections to swing free. However when the doors first drop or begin their opening movement owing to the fact that the fingers 163 are held against movement, the hinged sections 161 are compelled to swing back on their hinges and assume the position shown in Fig. 4, and prevent possibility of these sections striking the ground or stubs of the stalks and interfering with the complete opening of the doors and the dropping of the shock.

After the doors are completely opened the trips 166 are engaged by cams 168 and the fingers 163 dropped to permit the hinged sections to swing free.

After the shock has been dropped, the tube or bar 104 will be swung upward and the frame, comprising the bars b, b, and 103, carrying the platform, will be swung up aided by the springs 105 to avoid the shock. The bar 104 is afterwards moved down to its normal position on the frame 106 and the latter is then moved back into position on the main frame, by turning shaft 157 and pinions 159 and, during such movement, the platform and its frame, engaging the frame of the machine, will be lowered and brought to its normal position, when the doors of the platform will be locked. The tube 104 and guide rod 139 will be dropped into position, frames 130 and 136 turned back to operative position, and shaft 114 and worm 120 turned to return the platform 94 to the rear of the machine and in starting position for the next shock, the tracks 147 being swung up and held in such position by the hooks 154 engaging rod 139.

As will be seen by an examination of the drawings the cutter 7 severs the stalks some distance above the ground and to cut off this long stubble, a cutter 169 is provided and consists of a thin sheet of steel secured to a longitudinal bar 170 mounted to swing on links 171 and connected by a pitman 172 with a crank arm 173 on a shaft carrying a gear 174 meshing with and driven by gear 52 to reciprocate the cutter 169 and cut the stubble any height desired, the links 171 having adjustable connection with the machine frame.

The cutter is prevented from striking a stone, or other obstruction by depending guard fingers 175 as clearly shown in Fig. 1.

A brief description of the operation of our improved machine is as follows:—The stalks are cut by cutter 7 and carried rearward and upward by apron 18 and worm conveyers 25, 26 and 29, the upper and longer worm conveyer having increased pitch at its rear end to tilt the stalks backward and compel them to rest against upright apron 59 when they reach the track 57. The apron 59 moves the stalks along track 57 until a sufficient number have collected thereon, when pushers 91 and 92 move forward and eject the row of stalks onto platform 94 and against shock forming frame 130. At each successive movement of the pushers to eject another row of stalks onto platform 94 the platform moves forward and finally the desired number of stalks are received thereon and held in shock formation in frame 136. The shock is then compressed by band 142 and tied in any approved manner. The tracks 147 are then lowered and after the several interfering devices are moved out of the way as explained heretofore in detail, the platform 94 is run out onto tracks 147 and the shock dropped onto the ground. The parts are then returned to their former positions and the machine started to gather the stalks and form another shock.

By dropping the shock to one side of the machine, it will be observed that the shock is out of the way of the machine when it makes its next trip past this part of the field, which is a great improvement in the art.

A great many slight changes might be made in the general form and arrangement of parts described without departing from my invention and hence I do not restrict myself to the precise details set forth but consider myself at liberty to make such slight changes and alterations as fairly fall within the spirit and scope of my invention.

Having fully described my invention what I claim as new and desire to secure by Letters-Patent, is:—

1. In an apparatus of the character described, the combination of a platform, automatic means for moving the platform forwardly as stalks accumulate thereon, and means for moving the platform laterally to one side of the machine to drop the shock.

2. In an apparatus of the character described, the combination of a platform, automatic means for moving the platform forwardly as stalks accumulate thereon, means for cutting the stalks and conveying them to the platform, and means for moving the platform laterally to one side of the machine to drop the shock.

3. In an apparatus of the character described, the combination with a frame, of a platform on said frame, means for conveying stalks to said platform to form a shock thereon, and hinged tracks on the side of the machine frame, onto which the platform is run to drop the shock at one side of the machine.

4. In an apparatus of the character described, the combination with a machine frame, of a platform on said frame, means for conveying stalks to said platform to form a shock thereon, hinged tracks on the side of the machine frame, means for moving the platform out onto said tracks, and doors forming the support of said platform for the shock, and means for permitting said doors to swing open to drop the shock onto the ground.

5. In an apparatus of the character described, the combination with a frame, and traction wheels supporting the same, of a platform movable on said frame, means for depositing stalks on the platform, a shock forming frame on the platform to receive and support the stalks, a shock forming frame on the main frame into which the stalks are deposited by the platform frame, means for compressing the shock, and means for dropping the same.

6. In an apparatus of the character described, the combination with a platform, of a track extending across the machine, an upright apron conveyer for moving the stalks along the track, means for inclining said apron conveyer to position the stalks according to the incline of the ground, and means for pushing the stalks from the track onto the platform.

7. In an apparatus of the character described, the combination with a platform, of a track extending across the machine and having a hinged front to hold the stalks thereon, a pusher adapted to push the stalks from the track onto the platform, and a cord connecting the hinged front of the track with the pusher to permit the hinged section to fall when the pusher is moved forward.

8. In an apparatus of the character described, the combination with a platform, of a track extending across the machine, means for depositing stalks onto the track, and an apron conveyer to move the stalks along the track, and an intermittently operating pusher to engage the upper and lower ends of the stalks and push them from the track onto the platform.

9. In an apparatus of the character described, the combination with a platform, of a track extending across the machine, an endless apron conveyer to move the stalks along the track, a hinged frame supporting said apron, means for tilting said frame and apron to properly support the stalks according to the incline of the ground, a track on the frame, wheels or rollers on the apron to run on said track and hold the apron in proper position, means for propelling the apron, and means for forcing the stalks from the first-mentioned track onto the platform.

10. In an apparatus of the character described, the combination with a platform, of a track across the machine, a conveyer to move the stalks along the track, means for driving the conveyer, a pusher to force the stalks from the track onto the platform, and means operated by the pusher to stop the conveyer when the pusher is operated.

11. In an apparatus of the character described, the combination with a platform, of a track extending across the machine, means for cutting the stalks and depositing them onto the track, a conveyer to move the stalks along the track, a pusher to force the stalks from the track onto the platform, means for intermittently operating said pusher, and means operated by the pusher to stop the conveyer.

12. In an apparatus of the character described, the combination with a frame, of a platform movably mounted thereon, means for cutting stalks and depositing them onto the platform, means for moving the platform forward as the stalks collect thereon, and means operated by the platform when it reaches its extreme forward position with full supply of stalks thereon, to stop the mechanism for feeding stalks thereto.

13. In an apparatus of the character described, the combination with a stalk receiving platform, means for cutting the stalks, worm conveyers adapted to receive the stalks and support them in an upright position, an inclined apron conveyer to receive the stalks from the cutter and cooperate with the worm conveyers to carry the stalks rearward, a track receiving the stalks from the conveyers, and means for pushing the stalks from the track onto the platform.

14. In an apparatus of the character described, the combination with a cutter plate, of reciprocating bars at opposite sides of the cutter, and pivoted fingers in said bars adapted to hold the stalks up to the cutter.

15. In an apparatus of the character described, the combination with a cutter plate, of reciprocating bars at opposite sides of said plate means for reciprocating the bars in opposite directions, fingers on said bars to hold the stalks up to the cutter and said fingers free to pivot during their outward movement to pass the fingers of the other bar and the stalks, and springs normally holding said fingers at right angles to the bars.

16. In an apparatus of the character described, the combination with a platform, of a track, a cutter, an apron conveyer from the cutter to the track, three worm conveyers, two at one side and the third at the opposite side of the cutter and conveyer to hold the stalks in vertical position while being carried rearward, a conveyer to move the stalks along the track, means for forcing the stalks from the track onto the platform, and the pitch of the upper worm conveyer at one side increased at its rear end to tilt the stalks back against the track conveyer.

17. In an apparatus of the character described, the combination with a frame supported on wheels, of a carrier movable longitudinally of the frame, and a shock receiving platform movable laterally on the carrier to dump the shock at one side of the machine.

18. In an apparatus of the character described, the combination with a frame supported on wheels, of a carrier mounted to move longitudinally of the frame, a platform movable laterally of the carrier, automatic means for moving the carrier forward and hand operated means for moving the platform laterally.

19. In an apparatus of the character described, the combination with a frame supported on wheels, of a wheeled carrier movable longitudinally of the frame and a wheeled shock receiving platform movable laterally on the carrier.

20. In an apparatus of the character described the combination with a frame supported on wheels and having longitudinal tracks thereon, a wheeled carrier mounted to run on said tracks and having lateral tracks thereon, and a shock receiving platform having wheels mounted to run on the lateral tracks of the carrier and convey the shock to one side of the machine to drop the same out of the path of the machine.

21. In an apparatus of the character described, the combination with a frame supported on wheels, of a carrier movable longitudinally of the frame and having lateral tracks thereon, a shock receiving platform, wheels supporting said platform on the tracks, hinged tracks at the side of the machine to aline with the carrier tracks and permit the platform to be run out onto said hinged tracks, and means for dropping the shock from the platform.

22. In an apparatus of the character described, the combination with a machine supported on wheels, of a carrier movable longitudinally of the frame, lateral tracks on the carrier, a platform, wheels thereon mounted to run on said tracks, hinged doors forming the shock support of said platform, and devices under the control of the operator holding said doors in horizontal position and permitting them to fall and drop the shock.

23. In an apparatus of the character described, the combination of a shock receiving platform, comprising a tubular or rod frame, doors hinged thereon, and hinged sections at the edges of said doors, as and for the purpose described.

24. In an apparatus of the characted described, the combination of a shock receiving platform, comprising a tubular or rod frame, doors hinged thereto, hinged sections at the edges of the doors, and means for swinging said hinged sections when the doors are dropped.

25. In an apparatus of the character described, the combination of a shock receiving platform comprising doors hinged on tubes or rods, hinged sections at the inner edges of said doors, and means on said rods or tubes for swinging the hinged sections when the doors drop.

26. In an apparatus of the character described, the combination of a shock receiving platform comprising doors hinged on tubes or rods, hinged sections at the edges of the doors, collars loose on the rods or tubes, fingers on said collars, cords connecting said fingers with the hinged sections, a trip to hold the collars against movement and cause the cord to swing the hinged sections when the doors are dropped, and means on the door hinged to release the trip when the doors are fully opened.

27. In an apparatus of the character described, the combination with a frame supported on wheels, of a stalk receiving frame on the machine frame, a central rod on said stalk receiving frame, a movable stalk receiving platform adapted to convey the stalks to the stalk receiving frame, and an auxiliary stalk supporting frame on said platform.

28. In an apparatus of the character described, the combination with a frame supported on wheels, of a carrier movable longitudinally of the frame, a platform movable laterally on said carrier, a rack on said platform, and a pinion on the machine frame meshing with said rack and adapted to force the platform to one side of the machine to drop the shock.

In testimony whereof, I have signed this specification in the presence of two subscribing witnesses.

FRANCIS M. WIDERMAN.

Witnesses:
 T. N. DAVIS,
 H. SMUTCH.